US006870596B2

(12) United States Patent
Walker et al.

(10) Patent No.: US 6,870,596 B2
(45) Date of Patent: Mar. 22, 2005

(54) SUBWAY MOVIE/ENTERTAINMENT MEDIUM

(75) Inventors: Robert Walker, Winnipeg (CA); Bradley Caruk, Winnipeg (CA)

(73) Assignee: Sidetrack Technologies Inc., Winnipeg (CA)

( * ) Notice: Subject to any disclaimer, the term of this patent is extended or adjusted under 35 U.S.C. 154(b) by 0 days.

(21) Appl. No.: 10/332,100

(22) PCT Filed: Jul. 5, 2001

(86) PCT No.: PCT/CA01/00999

§ 371 (c)(1), (2), (4) Date: Jan. 3, 2003

(87) PCT Pub. No.: WO02/05251

PCT Pub. Date: Jan. 17, 2002

(65) Prior Publication Data

US 2004/0027540 A1 Feb. 12, 2004

Related U.S. Application Data

(63) Continuation-in-part of application No. 09/628,333, filed on Jul. 28, 2000, now abandoned.

(30) Foreign Application Priority Data

Jul. 6, 2000 (CA) ............................................ 2314281

(51) Int. Cl.[7] ............................................ G03B 25/00
(52) U.S. Cl. ............................................ 352/100
(58) Field of Search ..................... 352/98, 100; 40/453, 40/463

(56) References Cited

U.S. PATENT DOCUMENTS 3,704,064 A * 11/1972 Sollogoub et al. .......... 352/100
3,951,529 A 4/1976 Gandia
4,179,198 A 12/1979 Brachet et al.
4,383,742 A 5/1983 Brachet
5,108,171 A 4/1992 Spaulding
6,353,468 B1 * 3/2002 Howard et al. ............. 352/100
6,564,486 B1 * 5/2003 Spodek et al. ................ 40/453

FOREIGN PATENT DOCUMENTS

GB 2241813 9/1991

* cited by examiner

*Primary Examiner*—David Gray
*Assistant Examiner*—Arthur A Smith
(74) *Attorney, Agent, or Firm*—Ryan W. Dupuis; Adrian D. Battison; Michael R. Williams

(57) ABSTRACT

A system displays a collection of stationary images as a motion picture to passengers travelling in a vehicle along a pathway. The vehicle moves at a known speed and known distance from the images. The system includes an image illumination system including stroboscopic lighting for each image. The images, placed in parallel along the walls of the pathway of the vehicle, are adapted in number, size, and spacing for a vehicle travelling at the known speed and at the known distance from images on one or both sides of the vehicle such as to maintain an approximately constant viewing rate and perceived size of the images. The system includes mounting mechanisms for positioning each image vertically and at a constant distance from the train regardless of unevenness in wall contour. Glare due to interior lighting in the vehicle is reduced or eliminated by selecting the appropriate illumination intensity for the stroboscopic lighting.

16 Claims, 4 Drawing Sheets

SUBWAY MOVIE/ENTERTAINMENT MEDIUM

CROSS-REFERENCE TO RELATED APPLICATIONS

This application is a continuation-in-part of application Ser. No. 09/628,333 filed Jul. 28, 2000, now abandoned.

FIELD OF THE INVENTION

This invention relates to an apparatus for displaying a collection of stationary images as a motion picture to passengers in a vehicle, for example a train, travelling along a pathway in the vicinity of the images.

DESCRIPTION OF THE PRIOR ART

It is known to provide a motion picture system for viewing from a vehicle traveling along a fixed path. A known form of such a system comprises a plurality of static images, image mounts mounting the images along one side of the fixed path and an illumination system for illuminating each of the images intermittently. The proposed uses of these systems include commercial advertising, entertainment, and information provision. A variety of illumination methodologies, triggering mechanisms, and display mountings have been proposed.

The systems disclosed in U.S. Pat. Nos. 4,383,742 and 4,179,198 use electromagnetic triggers to sense the velocity of the moving vehicle and to synchronize the intermittent illumination of the images according to the vehicle speed and the image dimensions. Thus the speed of the motion picture varies with the speed of the train. Furthermore, the necessary synchronizing mechanism is quite complicated and therefore expensive. In the second patent, light flash emitting devices are installed on the vehicle at regular intervals. This requires modifications to the vehicle, which may prove expensive and undesirable.

U.S. Pat. No. 5,108,171, discloses, in one embodiment, a trigger mechanism responsive to a light signal from each window of the vehicle. In another embodiment, a reflector is associated with each window to reflect light from stationary light sources. This system requires modifications to and regular maintenance of the vehicle, which is expensive and undesirable.

U.S. Pat. No. 6,016,183 discloses the use of individual sets of screens and stroboscopic liquid crystal projectors for the display of images. Image signals are sent to the liquid crystal projectors from an image source such a digital video player. This combination is expensive.

U.S. Pat. No. 3,951,529 uses rear stroboscopic backlight for each image to illuminate the images but provides scant guidance on the size and placement of the images. Thus to an observer in the vehicle there is the undesirable possibility that only a partial view of an image is perceived through the closest vehicular window.

All of the patents referred to above are incorporated herein by reference.

One common problem with all of these patented inventions is the possibility of loss of synchronicity in illumination. In this case, the observer sees flashing black images, which detracts from the esthetic appeal of the motion picture. Another problem is the failure to account for change in the perceived size of the image if the distance between the vehicle and the wall changes. Therefore, for a passenger travelling in a vehicle through different areas where such a system is installed, there may be a great variation in perceived image size corresponding to differing cross-sectional width of the relevant pathways.

SUMMARY OF THE INVENTION

The present invention provides of the type described above characterized in that:

each image has a width $W_p$ and is spaced from the adjacent images by a spacing $W_i$ and the dimensions $W_p$ and $W_i$ are related to the vehicle speed by $$(W_p+W_i)\geqq V/R$$

where R is the viewing rate of the images and is greater than or equal to 24 images per second; and the illumination system includes a single trigger responsive to the approach of the vehicle to cause all of the images to be illuminated simultaneously at a fixed frequency greater than 24 Hz.

The images, of minor variation in successive content, give to an observer the illusion of a motion picture when seen rapidly and illuminated stroboscopically. The advantages of the apparatus over the prior art include its moderate cost, the relatively simple construction, installation, and maintenance of the constituent elements, and the improved view offered to passengers in the vehicle.

With this system at least twenty four images per second pass a stationary passenger in the moving vehicle regardless of the speed of the vehicle. The frequency of illumination is not synchronized with the vehicle speed or window positioning. The frequency is conveniently that of local mains current, usually 50 or 60 Hz.

In embodiments where the distance from the vehicle to an adjacent wall carrying the images varies along the path, the ratios of the image width and height to the vehicle to image spacing are maintained constant, either by varying the positioning of the images relative to the wall or varying the image size. This maintains the. perceived size of the images fairly constant.

BRIEF DESCRIPTION OF THE DRAWINGS

Embodiments of the invention will be described by way of example and with reference to the drawings in which.

DESCRIPTION OF THE PREFERRED EMBODIMENT

Figure 1:
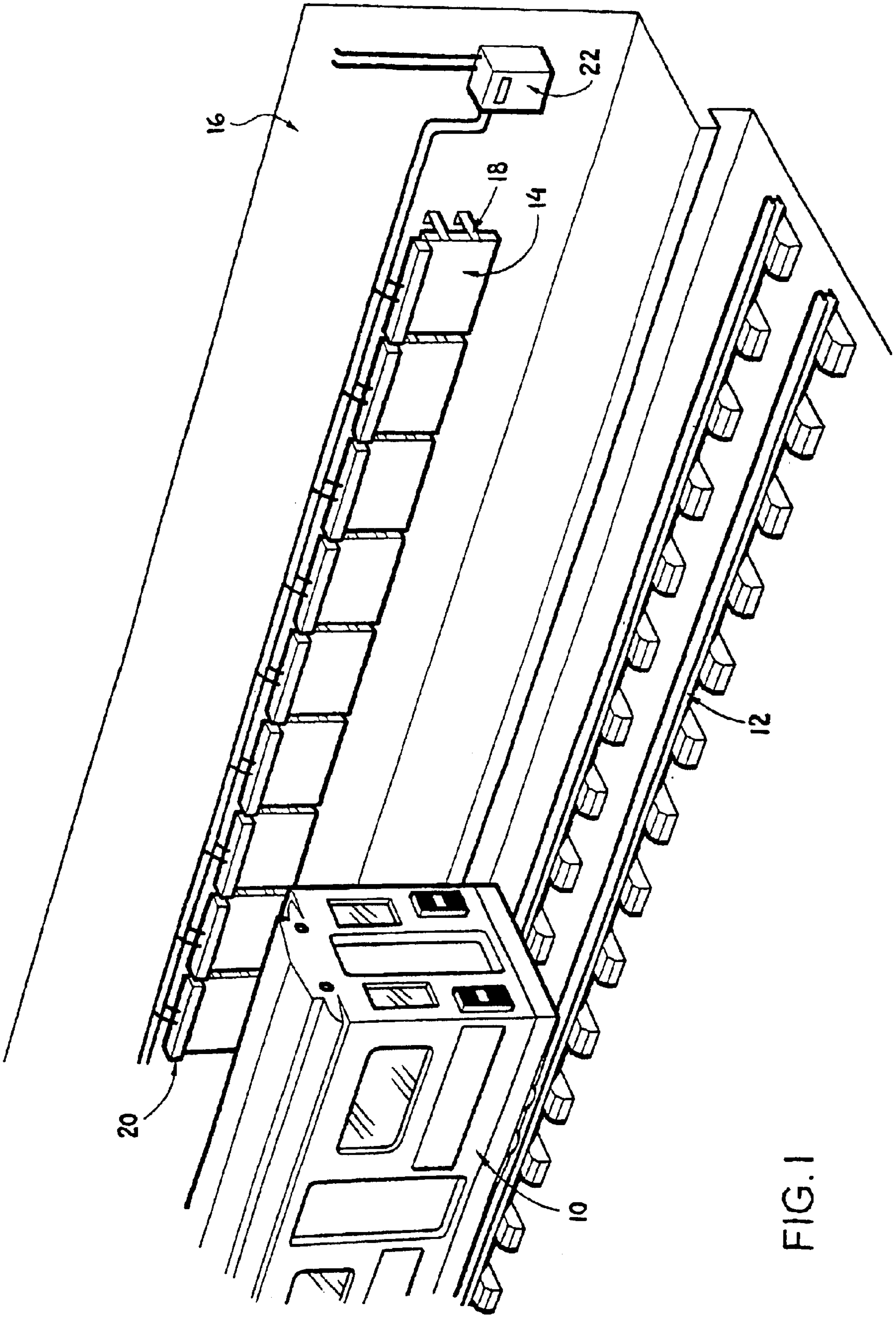
FIG. 1 is a perspective view of an installation of a system according to the present invention.

Referring to the accompanying drawings, one embodiment of the invention is illustrated in FIG. 1. A subway train 10 travels along a pathway defined by track 12. Along one sides of the vehicle's pathway are placed image panels 14, each of which displays one image. In this preferred embodiment, the image covers the whole of the image panel. Typically, solid walls 16 line the sides of the pathway, but this is not required for proper functioning of the invention. Each image panel 14 is mounted on the wall 16 by a panel mount 18. Each image panel 14 is Illuminated by a strobe light 20 directed towards the image on the front face of the panel. All of the strobe lights are operated by a common controller 22.

Figure 5:
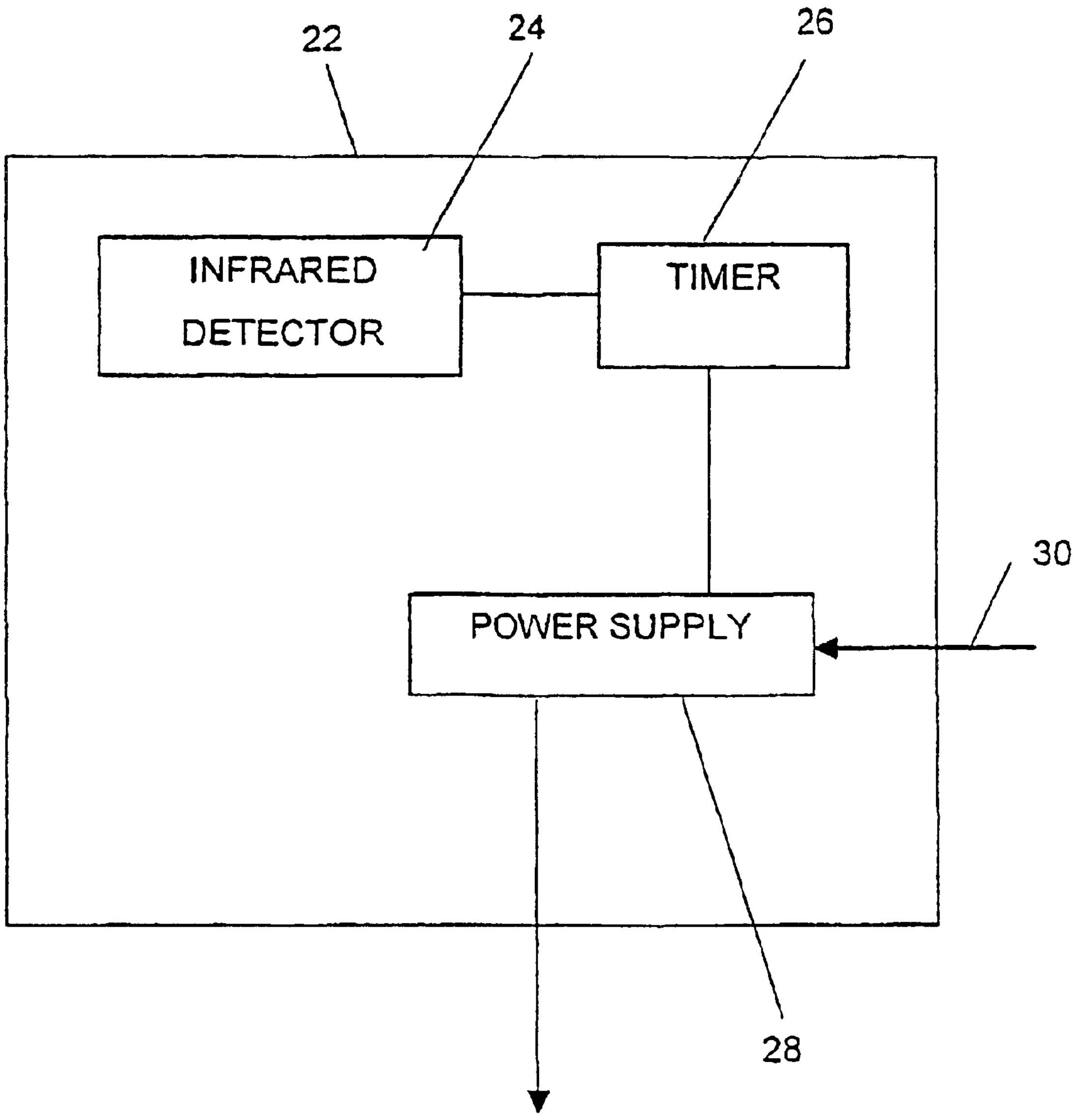
FIG. 5 is a schematic representation of the illumination system.

As illustrated in FIG. 5, the controller 22 includes an infrared (IR) motion detector 24 positioned to detect the approach of the train 10. On detection of the train, the IR detector starts a timer 26, which in turn actuates a strobe power supply 28. The power supply is connected to an AC mains power supply 30 and produces an output wave at mains frequency, either 50 or 60 Hz depending on location. This minimizes the complexity of the controller and eliminates any synchronization of the image illumination with either train speed or window position. After a preset time, the timer 26 counts out and the power supply is turned off. The time of operation is selected to be sufficient to allow passage of the subway train.

It is known that where the frequency at which images of minor variation are flashed to an observer at or in excess of about 24 cycles per second, the perception is that of smooth motion. The human mind fills in the intervening blank spaces to create an illusion of continuous motion. Furthermore, a separation of the still images is necessary. For example, on television, diagonal black bars are scanned at a rate of one-eighth to one-thirtieth per second; and cinematic films frames are separated by a fine black border.

If the frequency falls below this threshold of about 24 cycles per second, the psychological perception of continuous motion is not achieved; instead, any movements are seen as “jerky” and the images flash.

Figure 3:
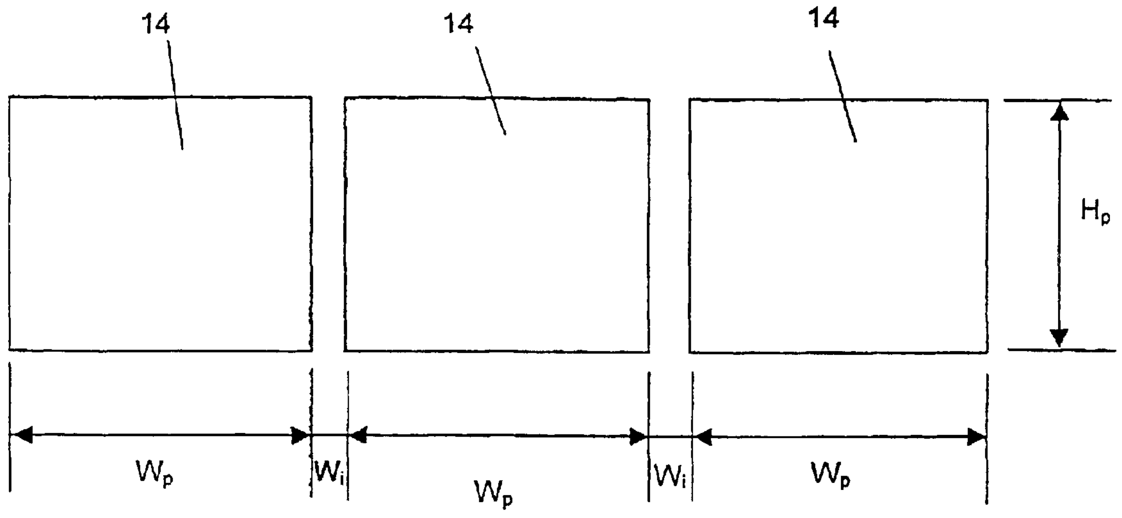
FIG. 3 is a schematic front view of a section of mounted panels.
Figure 4:
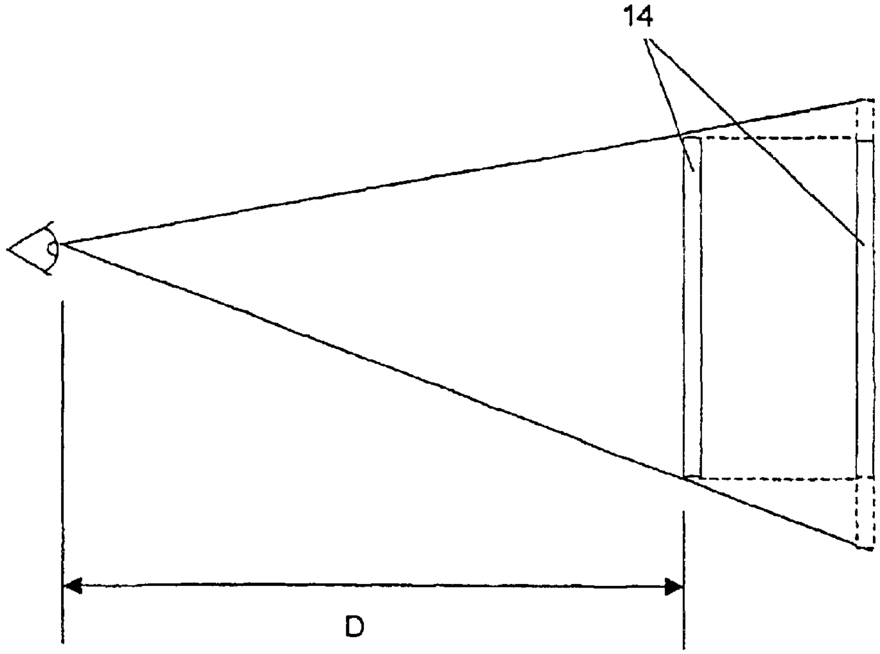
FIG. 4 is a schematic side view illustrating a system compensating for variations in the vehicle to image spacing.

Referring to FIGS. 3 and 4 of the drawings, each panel has a panel width $W_p$ and a height $H_p$. It is spaced from each adjacent panel by a spacing $W_i$. The image is spaced from the side of the train by a distance D. The speed at which a subway vehicle (or any conventional means of mass vehicular transport) travels during cruising speed is generally consistent from day to day. This is to permit detailed scheduling as well as for safety reasons. It is therefore an acceptable assumption that the speed of a subway train is relatively constant, consistent, and known in the region where the system is installed. Given that the threshold image viewing rate is about 24 cycles per second, this imposes an upper limit on the width $W_p$ of each image panel plus the spacing $W_i$ associated with the separation between images. The relationship is such that the minimum speed of the vehicle V is the multiplicative product of the panel width plus separating distance, and the continuous motion threshold (about 24):

$$V \leqq (W_p + W_1)R,$$

where R is the viewing rate of the images and is $\geqq 24$.

To maintain the largest possible image size, the viewing rate should be kept as close to 24 as possible.

If the speed of the vehicle increases, then the panel size plus separating distance must proportionately increase if the viewing rate by the observer in the vehicle is to remain at about 24 cycles per second. Considerations of aesthetic appeal mandate an increase of the size of each image panel with a concomitant decrease in the separating distance between the image panels. On the other hand, a decrease in the speed of the vehicle requires that the image panel size plus separating distance decrease. In fact, the image panel size actually decreases whereas the separating distance increases, again, for aesthetic reasons. Studies show that a maximum of five centimeters (two inches) is imposed on the separating distance between image panels. This upper limit works also to eliminate the possibility of loss of synchronicity so prevalent in other attempts at creating the same effect. In general, the cruising speed of a vehicle is unlikely to vary by a significant amount, and variations in panel size and interval tend to be minimal.

A desirable characteristic of a motion picture apparatus is to keep constant the dimensions of the image as perceived by the observers. As illustrated in FIG. 4, the size of an image as seen by an observer inside the vehicle is inversely proportional to the perpendicular distance from the observer (in practice the window of a vehicle) to the image panels. If this distance increases, in order to keep the perceived size constant, the absolute size of an image as carried by an image panel must increase proportionally. The ratios of image width $W_p$ and height $H_p$ to the distance from the train to the wall remain constant The consequent expansion or contraction in image panel size is compensated by a decrease or increase in the separating distance so as to leave unperturbed the viewing rate.

Therefore, the dimension and placement of the image panels are specified as a function of the speed of the travelling vehicle and the distance from the image panels to the train. For example, if the vehicle travels at about 80 kilometers per hour (50 miles per hour), which is equivalent to about 22.22 meters per second (73.35 feet per second), in order to afford a viewing rate of about 24 images per second, the width of each image panel plus the interval spacing is approximately one meter (three feet). Typically, the interval spacing on each side of an image is chosen as one-twelfth the size of the panel plus interval spacing, 8.3 centimeters (3 inches). If the distance to the wall increases by five percent, then the image panel size increases proportionately to 96.2 centimeters meters (2 feet 10.7 inches), and the interval spacing should be set at about 3.8 centimeters (1.3 inches).

Figure 2:
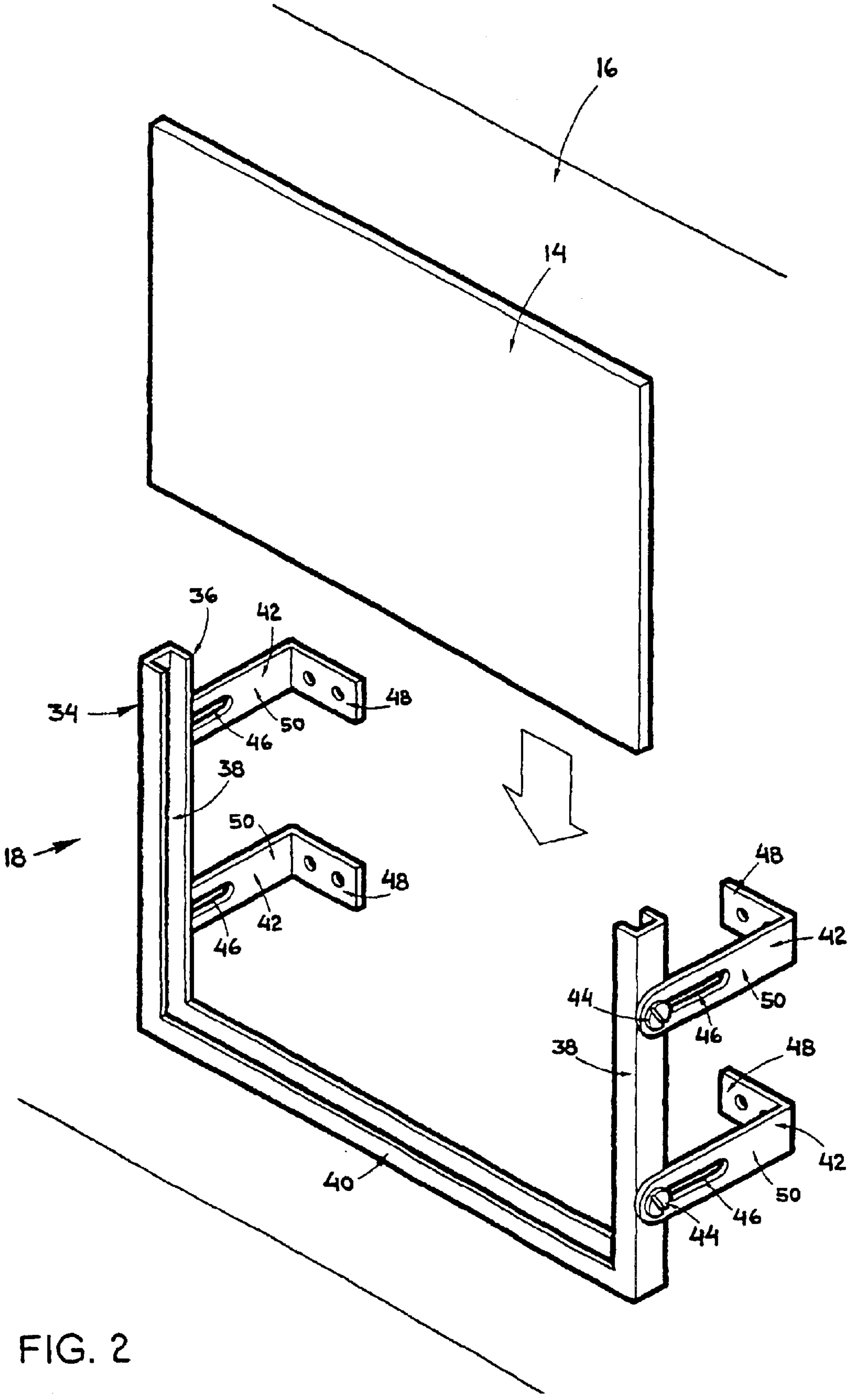
FIG. 2 is a perspective view of a panel mounting device.

As illustrated most particularly in FIG. 2, the image panels 14 are constructed of rigid materials so as to avoid movement on the passage of a vehicle due to the displacement of air. Image mounts 18 affix the image panels 14 to the wall 16 of the vehicle's pathway. The panel holder 34 includes a U-shaped frame 36 with upright arms 38 and a base 40 configured as channels to receive the side and bottom edges of an image panel. Each of the arms 38 is connected to two angle brackets 42 by fasteners 44 fixed to the arms and slots 46 in the brackets. Tightening the fasteners fixes the position of the arms along the slots. The angle brackets have base flanges 48 mounted on the wall, so that the flanges 50 in which the slots are formed project forwardly from the wall. Thus, the image panels may be each positioned vertically at a generally uniform distance from the train, regardless of the contour of the supporting wall. Of course minor variations may exist due to serious defects in the wall or general conditions.

Illumination of each image panel is provided through the strobe lights 20 which are attached to the wall and located immediately above the image mounts 32. The orientation of with each light is preferably adjustable, using a rotating light head and “barn door” flaps. In order to reduce or practically eliminate the effect of glare from other light sources on the inside windows of a vehicle, the intensity of strobe illumination should be such that 75 per cent of illumination perceived by an observer on passing through the region of the image panels derives from the external strobe lighting and the balance from sources within the vehicle. A further option is to reduce the internal lighting of the vehicle on entering into a vicinity of the image panels.

Each set of lights is preferably connected to the next set by interlocking receptacles. This produces modularity, resulting in ease of extension and maintenance.

It will be appreciated that the description above relates to the preferred embodiments by way of example only. Many possible variations on the apparatus will be evident to those knowledgeable in the field, and such variations are intended to be within the scope of the invention as described and claimed, whether or not expressly described.

As one example, the vehicle used in the foregoing description is a subway train travelling in an underground subway tunnel. However, this invention is adaptable to be used for outdoor rail systems, monorails, elevators, or any form of transportation where images may be viewed from a moving position and the prevailing lighting conditions are appropriate or are appropriately adjustable.

The preceding description has described the viewing of a motion picture through the windows on one side of a train. It is to be understood that images may be provided on both sides where appropriate conditions exist. Where used, the images on opposite sides need not be of the same motion picture.

What is claimed is:

1. A moving picture system for viewing from a vehicle travelling along a fixed path at a substantially constant speed V, the system comprising:

a plurality of static images;

image mounts mounting the images along one side of the fixed path, each image having a width $W_p$ and being spaced from the adjacent images by a spacing $W_i$, the dimensions $W_p$ and $W_i$ being related to the vehicle speed by $$(W_p+W_i)\geqq V/R$$

where R is the viewing rate of the images and is greater than or equal to 24 images per second; and a static illumination system for illuminating each of the images intermittently, and including a single trigger responsive to the approach of the vehicle to cause all of the images to be illuminated simultaneously at a fixed frequency greater than 24 Hz, wherein each image is spaced from the vehicle by a distance D and wherein the ratio $W_p$:D is substantially constant from image to image.

2. A system according to claim 1 wherein the spacing $W_i$ between images is less than or equal to 5 centimeters.

3. A system according to claim 1 wherein the spacing $W_i$ is one-twelfth of the panel width of $W_p$.

4. A system according to claim 1 wherein the trigger comprises a motion sensor for detecting the approach of a moving vehicle.

5. A system according to claim 4 wherein the trigger is an infrared motion detector.

6. A system according to claim 1 including a timer connected to the trigger for maintaining operation of the illumination system for a pre-determined duration.

7. A system according to claim 1 wherein the system is operated from an A/C power supply with a frequency f and wherein the illumination system is coupled to the A/C power supply to illuminate the images at frequency f.

8. A system according to claim 1 wherein the image mounts mount the panels on a wall at a spacing from the wall and each image mount includes an adjustment means for selecting the spacing of the respective panel from the wall.

9. A moving picture system for viewing from a vehicle travelling along a fixed path at a substantially constant speed V, the system comprising;

a plurality of static images;

image mounts mounting the images along one side of the fixed path, each image having a width $W_p$ and being spaced from the adjacent images by a spacing $W_i$ the dimensions $W_p$ and $W_i$ being related to the vehicle speed by $$(W_p+W_i)\geqq V/R$$

where R is the viewing rate of the images and is greater than or equal to 24 images per second; and a static illumination system for illuminating each of the images intermittently, the illumination system including a single trigger responsive to the approach of the vehicle to cause all of the images to be illuminated simultaneously at a fixed frequency greater than 24 Hz, wherein each image has an image height $H_p$ and wherein the image is spaced from the vehicle by a distance D and wherein the ratio $H_p$:D is substantially constant from image to image.

10. A system according to claim 9 wherein the spacing $W_i$ between images is less than or equal to 5 centimeters.

11. A system according to claim 9 wherein the spacing $W_i$ is one-twelfth of the panel width of $W_p$.

12. A system according to claim 9 wherein the trigger comprises a motion sensor for detecting the approach of a moving vehicle.

13. A system according to claim 12 wherein the trigger is an infrared motion detector.

14. A system according to claim 9 including a timer connected to the trigger for maintaining operation of the illumination system for a pre-determined duration.

15. A system according to claim 9 wherein the system is operated from an A/C power supply with a frequency f and wherein the illumination system is coupled to the A/C power supply to illuminate the images at frequency f.

16. A system according to claim 9 wherein the image mounts mount the panels on a wall at a spacing from the wall and each image mount includes an adjustment means for selecting the spacing of the respective panel from the wall.

* * * * *